(12) United States Patent
Prause et al.

(10) Patent No.: US 11,685,082 B2
(45) Date of Patent: Jun. 27, 2023

(54) METHODS AND SYSTEMS FOR FORMING COMPOSITE STRINGER ASSEMBLIES

(71) Applicant: The Boeing Company, Chicago, IL (US)

(72) Inventors: Richard Alexander Prause, Charleston, SC (US); Richard E. Heath, Mt. Pleasant, SC (US); Andrew E. Modin, Charleston, SC (US); Byron James Autry, Charleston, SC (US); Ivan Gilberto Ramirez, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/467,056

(22) Filed: Sep. 3, 2021

(65) Prior Publication Data
US 2022/0134610 A1    May 5, 2022

Related U.S. Application Data

(60) Provisional application No. 63/107,757, filed on Oct. 30, 2020.

(51) Int. Cl.
*B29C 33/00* (2006.01)
*B29C 43/00* (2006.01)
(Continued)

(52) U.S. Cl.
CPC ............ *B29C 43/02* (2013.01); *B29C 33/485* (2013.01); *B29C 33/505* (2013.01);
(Continued)

(58) Field of Classification Search
CPC ......... B29C 33/00; B29C 33/40; B29C 33/48; B29C 33/485; B29C 33/50; B29C 33/505;
(Continued)

(56) References Cited

U.S. PATENT DOCUMENTS

| 4,126,659 A | * | 11/1978 | Blad | B29C 53/845 |
| | | | | 156/80 |
| 2018/0319050 A1 | * | 11/2018 | Prause | B29C 70/462 |
| 2020/0331179 A1 | * | 10/2020 | Stein | B29C 44/50 |

FOREIGN PATENT DOCUMENTS

| WO | 9854046 A2 | 12/1998 |
| WO | 2004011169 A2 | 2/2004 |

OTHER PUBLICATIONS

European Application Serial No. 21200151.5, Search Report dated Mar. 21, 2022, 8 pages.

* cited by examiner

*Primary Examiner* — Jacob T Minskey
*Assistant Examiner* — Matthew Hoover
(74) *Attorney, Agent, or Firm* — Kwan & Olynick LLP

(57) ABSTRACT

Described herein are methods and systems for forming composite stringer assemblies or, more specifically, for shaping composite charges while forming these stringer assemblies. A system comprises a bladder, having a bladder core, and a bladder skin. The bladder core is formed from foam. The bladder skin is formed from an elastic material and encloses the bladder core. When a composite stringer assembly is formed, the bladder is positioned over a charge base. The charge base later becomes a stringer base, such as a fuselage section or a wing skin. A charge hat is then positioned over the bladder and is conformed to the bladder. A combination of the bladder skin and the bladder core provides support during this forming operation and later while the stringer assembly is cured. In some examples, the bladder core is collapsible for the removal of the bladder from the cavity of the stringer assembly.

20 Claims, 17 Drawing Sheets

(51) Int. Cl.
  B29C 70/00 (2006.01)
  B29D 99/00 (2010.01)
  B64C 1/00 (2006.01)
  B29C 43/02 (2006.01)
  B29C 33/48 (2006.01)
  B29C 33/50 (2006.01)
  B29C 43/36 (2006.01)
  B29C 43/56 (2006.01)
  B29C 70/02 (2006.01)
  B29C 70/34 (2006.01)
  B29C 70/44 (2006.01)
  B29C 70/46 (2006.01)
  B29C 70/54 (2006.01)
  B64C 1/06 (2006.01)
  B29K 105/04 (2006.01)
  B29K 105/08 (2006.01)
  B29L 31/30 (2006.01)

(52) U.S. Cl.
  CPC ........ *B29C 43/361* (2013.01); *B29C 43/3642* (2013.01); *B29C 43/56* (2013.01); *B29C 70/02* (2013.01); *B29C 70/342* (2013.01); *B29C 70/44* (2013.01); *B29C 70/462* (2013.01); *B29C 70/541* (2013.01); *B29D 99/0003* (2013.01); *B29D 99/0014* (2013.01); *B64C 1/068* (2013.01); *B29C 2043/3613* (2013.01); *B29C 2043/3644* (2013.01); *B29K 2105/045* (2013.01); *B29K 2105/0872* (2013.01); *B29L 2031/3076* (2013.01); *B32B 2266/02* (2013.01); *B64C 2001/0072* (2013.01)

(58) Field of Classification Search
  CPC ......... B29C 43/00; B29C 43/02; B29C 43/30; B29C 43/36; B29C 43/361; B29C 43/364; B29C 43/3642; B29C 43/50; B29C 43/56; B29C 70/00; B29C 70/02; B29C 70/30; B29C 70/34; B29C 70/342; B29C 70/40; B29C 70/44; B29C 70/46; B29C 70/462; B29C 70/50; B29C 70/54; B29C 70/541; B29D 99/00; B29D 99/0003; B29D 99/001; B29D 99/0014; B64C 1/00; B64C 1/06; B64C 1/068
  See application file for complete search history.

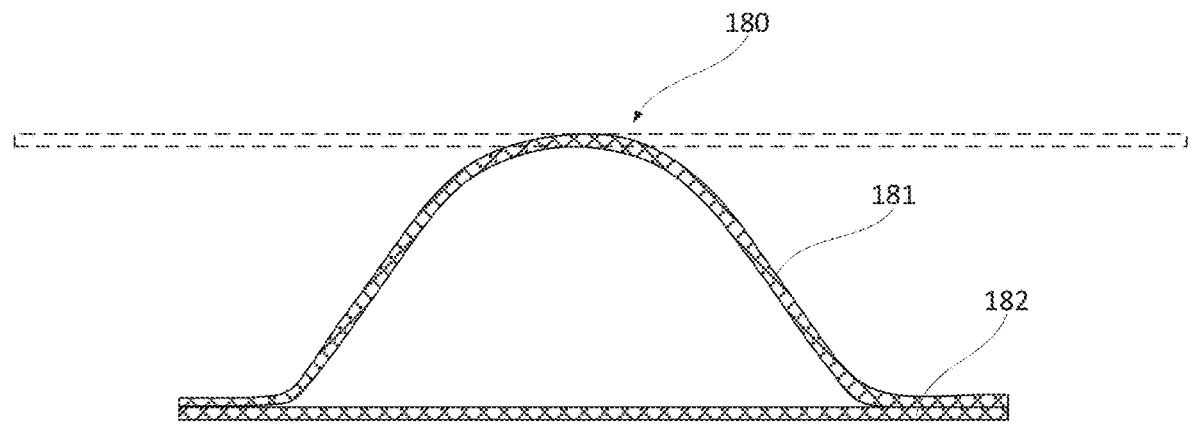
FIG. 1A
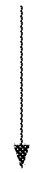
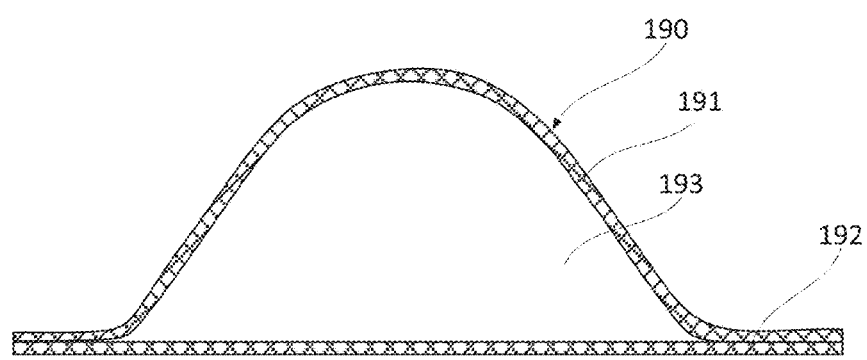
FIG. 1B

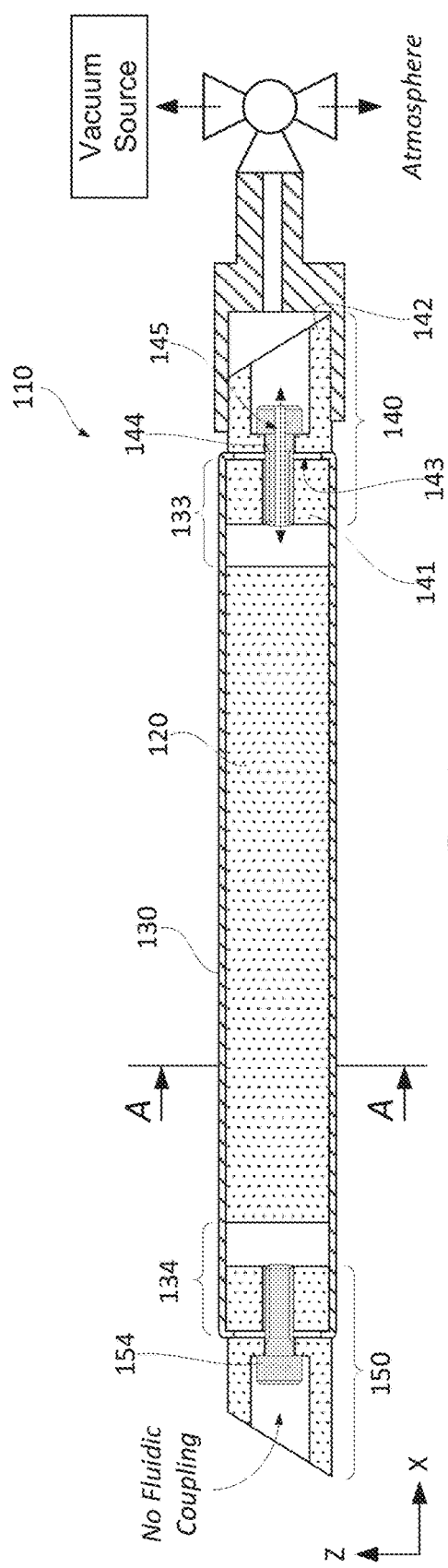
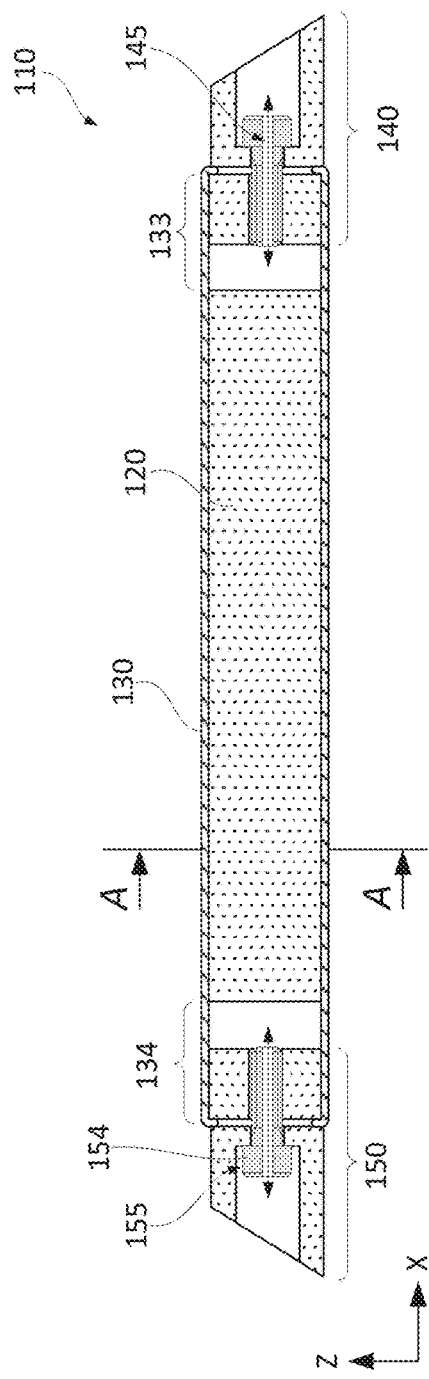

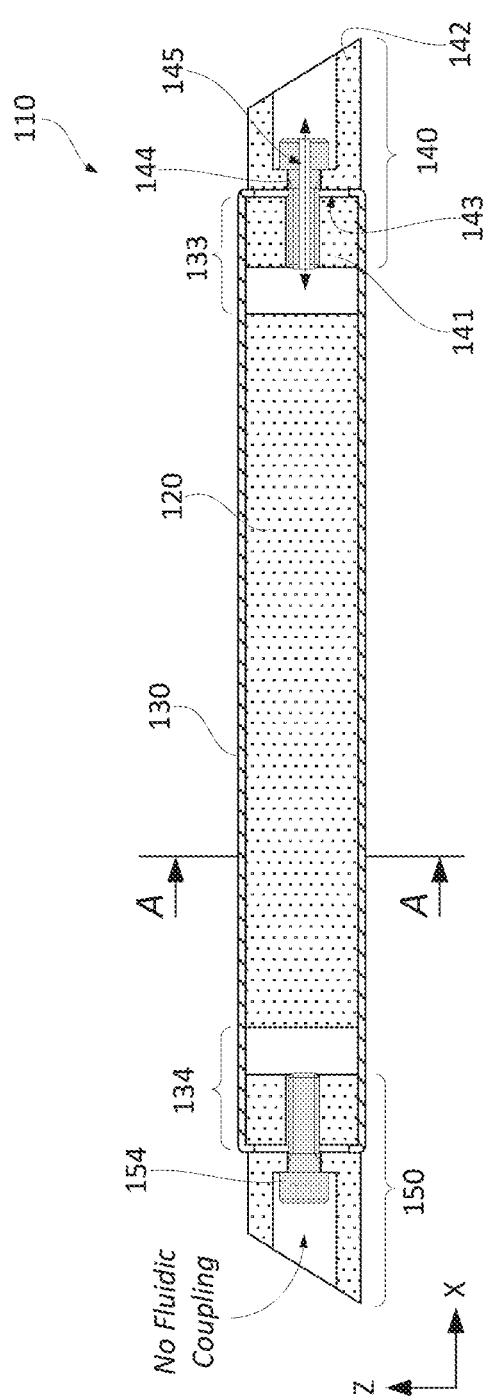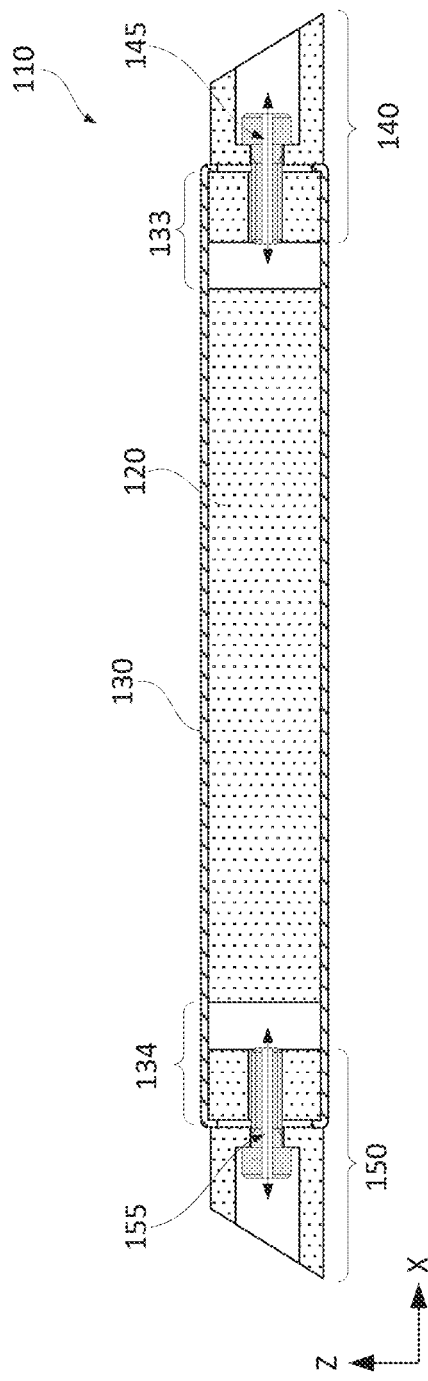

METHODS AND SYSTEMS FOR FORMING COMPOSITE STRINGER ASSEMBLIES

CROSS-REFERENCE TO RELATED APPLICATIONS

This application claims the benefit under 35 U.S.C. § 119(e) of U.S. Provisional Patent Application 63/107,757, filed on 2020 Oct. 30, which is incorporated herein by reference in its entirety for all purposes.

BACKGROUND

Composite materials have become more popular for various applications including, but not limited to, aircraft manufacturing. Specifically, composite materials have an excellent strength-to-weight ratio, which is highly desirable for lightweight applications. For example, aircraft fuselages and wings are fabricated using composite sheets in some instances. These composite sheets are reinforced with composite stringers to further improve the stiffness of the overall assembly.

Composite stringers, fuselage sections, and wing skins are often manufactured as separate components. These separate components are then attached using, e.g., fasteners or adhesives. In some instances, some component fabrication steps overlap. For example, stringers, fuselage sections, and/or wing skins are co-cured together. This co-curing operation is also used to attach these components.

In either case, the fabrication of composite structures requires complex sophisticated equipment. Furthermore, many aircraft components are large, which further complicates the fabrication process and equipment. For example, shaping a composite stringer over a composite sheet requires a supporting structure (e.g., a mandrel). This supporting structure defines the final shape of the composite stringer. First, this supporting structure needs to be positioned between the composite stringer and composite sheet, tight tightly conforming to both components. However, this supporting structure needs to be removed later, from the cavity formed by the composite stringer and composite sheet. This removal operation is challenging using conventional supporting structures, especially when stringers are long.

SUMMARY

Described herein are methods and systems for forming composite stringer assemblies or, more specifically, for shaping composite charges while forming these stringer assemblies. A system comprises a bladder, having a bladder core, and a bladder skin. The bladder core is formed from foam. The bladder skin is formed from an elastic material and encloses the bladder core. When a composite stringer assembly is formed, the bladder is positioned over a charge base. The charge base later becomes a stringer base, such as a fuselage section or a wing skin. A charge hat is then positioned over the bladder and is conformed to the bladder. A combination of the bladder skin and the bladder core provides support during this forming operation and later while the stringer assembly is cured. In some examples, the bladder core is collapsible for the removal of the bladder from the cavity of the stringer assembly.

In some examples, a bladder for shaping a composite charge while forming a composite stringer assembly comprises a bladder core and a bladder skin. The bladder core is formed from foam and comprises a base surface and a hat-shaping surface. The bladder skin is formed from an elastic material. The bladder skin encloses the bladder core. At least a portion of the bladder skin contacts, conforms, and compresses each of the base surface and the hat-shaping surface.

In some examples, a method of assembling a bladder using a bladder-assembly tool, comprising a bladder-assembly cavity, comprises positioning a bladder skin, comprising an interior skin surface, into the bladder-assembly cavity, comprising a cavity surface. The method further comprises sealing the bladder skin against the cavity surface at each end of the bladder-assembly tool and reducing a first pressure, between the cavity surface and the bladder skin, relative to a second pressure, at the interior skin surface, thereby stretching the bladder skin and conforming the bladder skin against the cavity surface. The method also comprises inserting a bladder core into the bladder skin while the bladder skin is conformed to the cavity surface and equalizing the first pressure and the second pressure thereby allowing bladder skin to shrink and allowing at least a portion of the bladder skin to conform to the bladder core.

In some examples, a method of forming a composite stringer assembly from a composite charge using a stringer forming tool, comprising a bladder, comprises positioning the bladder over a charge base, positioned over a tool base of the stringer forming tool, positioning a charge hat over the bladder, comprising a bladder core and a bladder skin, and positioning a flexible cover of the stringer forming tool over the charge hat and sealing the flexible cover against the tool base. The method further comprises reducing a first forming pressure, between the flexible cover and the tool base below a second forming pressure at an outer cover surface and also below a third forming pressure inside the bladder thereby forcing the charge hat against the bladder with the flexible cover. The method also comprises curing the charge base and charge hat while the charge hat is forced against the bladder thereby forming a stringer base and a stringer hat of the composite stringer assembly and removing the bladder from a stringer cavity.

BRIEF DESCRIPTION OF THE DRAWINGS

FIG. 1A is a schematic illustration of a composite charge, comprising a charge base and a charge hat, and used to form a composite stringer assembly, in accordance with some examples.

FIG. 1B is a schematic illustration of a composite stringer assembly, comprising a stringer base and a stringer hat and formed from the composite charge in FIG. 1A, in accordance with some examples.

FIGS. 2A, 2B, and 2C are schematic cross-sectional views of a bladder for shaping composite charges, in accordance with some examples.

FIGS. 11A and 11B are schematic cross-sectional views of two examples of the bladder with different end fittings, in accordance with some examples.

DETAILED DESCRIPTION

Figure 2A:
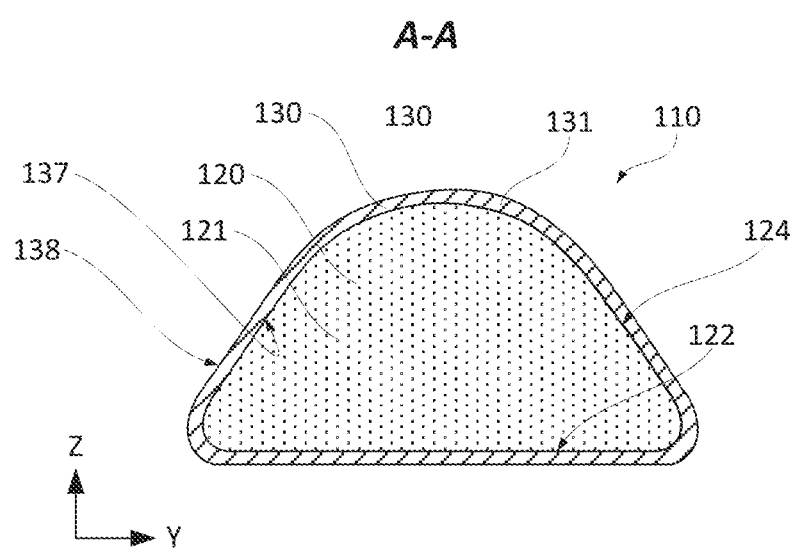

In the following description, numerous specific details are outlined to provide a thorough understanding of the presented concepts. In some examples, the presented concepts are practiced without some or all of these specific details. In other examples, well-known process operations have not been described in detail to unnecessarily obscure the described concepts. While some concepts will be described in conjunction with the specific examples, it will be understood that these examples are not intended to be limiting.

Introduction

As noted above, the fabrication of composite stringers and assemblies, comprising these stringers, is challenging and requires complex tools especially when hat-style stringers are co-formed or, more specifically, co-cured with a stringer base. These complexities and challenges will now be explained with reference to FIGS. 1A and 1B. Specifically, FIG. 1A is a schematic illustration of composite charge 180, used to form composite stringer assembly 190, which is shown in FIG. 1B, Composite charge 180 comprises charge base 182 and charge hat 181. While FIG. 1A illustrates composite charge 180 in a shaped state, one having ordinary skill in the art would understand that the initial shape of charge base 182 and/or charge hat 181 can be different. In some examples, charge hat 181 is provided as a planar structure as, e.g., schematically shown with a dashed line in FIG. 1A. In some examples, charge base 182 and/or charge hat 181 are shaped using a stringer forming tool as further described below. For simplicity, a bladder is not shown in FIGS. 1A and 1B.

FIG. 1B is a schematic illustration of composite stringer assembly 190, comprising stringer base 192 and stringer hat 191. Stringer hat 191 may be also referred to as a stringer. This composite stringer assembly 190 is formed from composite charge 180 in FIG. 1A, in accordance with some examples. One having ordinary skill in the art would understand that stringer base 192 is often a part of another component, such as a fuselage section or a wing skin. Stringer base 192 is formed from charge base 182 of composite charge 180. Stringer hat 191 is formed from charge hat 181 of composite charge 180. When stringer base 192 and stringer hat 191 are formed, these components are also joined together, e.g., by co-curing.

As shown in FIG. 1B, stringer base 192 and stringer hat 191 form stringer cavity 193. While composite stringer assembly 190 is being formed, stringer base 192 and stringer hat 191 or, more specifically, charge base 182 and charge hat 181 need to be supported internally (from within stringer cavity 193). This is accomplished by positioning a bladder into stringer cavity 193. The bladder conforms to each of stringer base 192 and stringer hat 191. However, the bladder needs to be removed from stringer cavity 193 once composite stringer assembly 190 is formed. This combination of supporting, conforming, and removable characteristics present major challenges to the bladder's design and structure. For example, conventional bladders are difficult to remove as these bladders maintain their shape during all processing stages.

Described herein are methods and systems using specially configured bladders addressing these challenges. Specifically, a bladder comprises a bladder core and bladder skin. The bladder core is formed from foam, allowing fluidic distribution within the bladder (e.g., to collapse the bladder during removal). The bladder skin is formed from an elastic material. The bladder skin encloses the bladder core and isolated the bladder core from charge hat 181 and charge base 182. At least a portion of the bladder skin contacts, conforms, and compresses the surface of the bladder core. In other words, this bladder skin portion is stretched over the bladder core. This stretching ensures the conformality of the bladder skin. Furthermore, the elastic nature of the bladder skin enables the assembly of the bladder. Specifically, the bladder skin is stretched when inserting the bladder core inside the bladder skin. The bladder skin may be referred to as an undersized elastomer sleeve. The bladder core may be referred to as a foam mandrel.

Bladder Examples

Additional features and examples of the bladder will now be described with reference to FIGS. 2A, 2B, and 2C. Specifically, FIG. 2A illustrates a cross-section of bladder 110 by a plane (the Y-Z plane) perpendicular to the length of bladder 110. For purposes of this disclosure, the length of bladder 110 extends along the X-axis. FIG. 2B illustrates another cross-section of bladder 110 by a plane (the X-Z plane), which includes the length of bladder 110. FIG. 2B also illustrates another cross-section of bladder 110 by the X-Z plane, showing different examples of end fittings of bladder 110.

Referring to FIG. 2A, bladder 110 comprises bladder core 120 and bladder skin 130, enclosing bladder core 120. This cross-section in FIG. 2A corresponds to the cross-section of composite charge 180 in FIG. 1A and also corresponds to the cross-section of composite stringer assembly 190 in FIG. 1B. More specifically, the profile of bladder skin 130 (e.g., the profile exterior skin surface 138 of bladder skin 130) is the same as the profile of stringer cavity 193. When bladder 110 is used for shaping composite charge 180, bladder skin 130 or, more specifically, exterior skin surface 138 comes into contact with composite charge 180. Bladder core 120 helps to maintain the shape of bladder skin 130 and, as a result, to define the shape of composite charge 180.

In some examples, bladder core 120 is formed from foam 121, such as an open-cell foam or a closed-cell foam. In some examples, foam 121 provides fluidic communication within bladder 110, e.g., when the pressure inside bladder 110 is reduced. Gas is added to or removed from bladder 110, e.g., to make bladder 110 more compact when bladder 110 is removed from composite stringer assembly 190. This feature is further described below with reference to FIG. 13D. Some examples of suitable foam materials for bladder core 120 include, but are not limited to, polyethylene terephthalate (PET) foam, such as Divinycell P foam, available from Diab Group in Helsingborg, Sweden. In some examples, the selection of foam 121 is such that bladder core 120 withstands a full atmosphere of pressure at room temperature, but I collapses under vacuum pressure at elevated cure temperatures.

Bladder core 120 comprises base surface 122 and hat-shaping surface 124. Base surface 122 defines the shape of stringer base 192, while hat-shaping surface 124 defined the shape of stringer hat 191. In some examples, base surface 122 is substantially planar. In the same or other examples, hat-shaping surface 124 is curved. One having ordinary skill in the art would understand that the shape of hat-shaping surface 124 defines the shape of stringer hat 191 formed using this bladder 110. As such, various shapes of hat-shaping surface 124 are within the scope. In some examples, the profile of base surface 122 and hat-shaping surface 124, plus the thickness of bladder skin 130, is the same as the profile of stringer cavity 193.

Bladder skin 130 is formed from elastic material 131. Some examples of elastic material 131 include, but are not limited to, silicone, Viton, and butyl rubber. In some examples, the wall thickness of bladder skin 130 is between 1 millimeter and 5 millimeters or, more specifically, between 2 millimeters and 4 millimeters, such as about 2.5 millimeters. At least a portion of bladder skin 130 contacts, conforms, and compresses each of base surface 122 and hat-shaping surface 124 of bladder core 120. In some examples, bladder skin 130 is stretched at least about 1% over bladder core 120, at least about 2%, at least about 5%, and at least about 10% or even at least about 20%. Stretching of bladder skin 130 helps to conform bladder skin 130 to bladder core 120 without any wrinkles or other imperfections. However, this stretching also compresses bladder core 120 and excessive compression may impact the shape of bladder core 120. As such, excessive stretching (e.g., greater than 50%) should be avoided.

Referring to FIGS. 2B and 2C, in some examples, bladder skin 130 comprises one or two extensions, such as extension 133 and second extension 134. The extensions of bladder skin 130 extend past bladder core 120 and are not in contact with bladder core 120. The remaining part of bladder skin 130 is in contact with bladder core 120, e.g., conforming and compressing bladder core 120. In some examples, an extension is used, e.g., to form fluidic connections to bladder 110 or, more specifically, to the interior of bladder 110 and bladder core 120. Specific examples include extension 133 in FIGS. 2B and 2C and second extension 134 in FIG. 2C. In the same or other examples, an extension is used to seal the end of bladder 110 such as second extension 134 in FIG. 2B.

Referring to FIGS. 2B and 2C, in some examples, bladder 110 further comprises end fitting 140, sealably coupled to extension 133 of bladder skin 130. In some examples, end fitting 140 comprises pass-through 145, fluidically coupled to bladder core 120. Pass-through 145 is used to supply or remove gas from the interior of bladder 110. For example, gas is removed from the interior to reduce the size of bladder skin 130 and to collapse bladder core 120, as further described below with reference to FIG. 13D. In some examples, pass-through 145 is selectively couplable to an atmosphere or a vacuum source 109.

Referring to FIGS. 2B and 2C, in some examples, end fitting 140 comprises first component 141 and second component 142. Second component 142 is detachably coupled to first component 141, e.g., using screw 144. In more specific examples, second component 142 forms channel 143 between first component 141 and second component 142. Extension 133 of bladder skin 130 encloses, conforms, and compresses first component 141 and partially extends into channel 143. More specifically, extension 133 is compressed between first component 141 and second component 142 with channel 143 to ensure the sealing of bladder skin 130 relative to end fitting 140, as further described below with reference to FIGS. 10A, 10B, and 10C.

Referring to FIGS. 2B and 2C, in some examples, first component 141 and second component 142 are detachably coupled using screw 144. This detachably coupling allows positioning extension 133 over first component 141 before connecting second component 142 thereby simplifying the overall assembly of bladder 110. In more specific examples, pass-through 145 extends through screw 144. This feature allows adding or removing pass-through 145 by replacing screw 144, e.g., a screw with pass-through 145 and a screw without pass-through 145.

Referring to FIGS. 2B and 2C, in some examples, bladder skin 130 comprises second extension 134, extending past bladder core 120 and away from extension 133. Bladder core 120 is positioned between extension 133 and second extension 134. Second extension 134 allows forming a fluidic connection to this side of bladder 110 or seal bladder 110. For example, FIG. 2B illustrates second extension 134 being sealed and gas-impermeable. More specifically, in this example, bladder 110 comprises second end fitting 150, sealably coupled to second extension 134 of bladder skin 130 and blocking the fluid access to bladder core 120, at least from this side of second extension 134.

Referring to FIG. 2C, in some examples, second end fitting 150 comprises second-fitting pass-through 155, fluidically coupled to bladder core 120. For example, second-fitting pass-through 155 passes through second screw 154. Replacing second screw 154 allows switching from one configuration of bladder 110, shown in FIG. 2B, to another configuration of bladder 110, shown in FIG. 2C.

In some examples, the design of second end fitting 150 is the same as the design of end fitting 140. For example, second end fitting 150 comprises two components, one of which is sealably coupled to second extension 134. Furthermore, these two components are detachably coupled to each other. Finally, a portion of second extension 134 extends and is compressed between these two components, when the two components are attached.

Examples of Methods of Assembling Bladders

Figure 3:
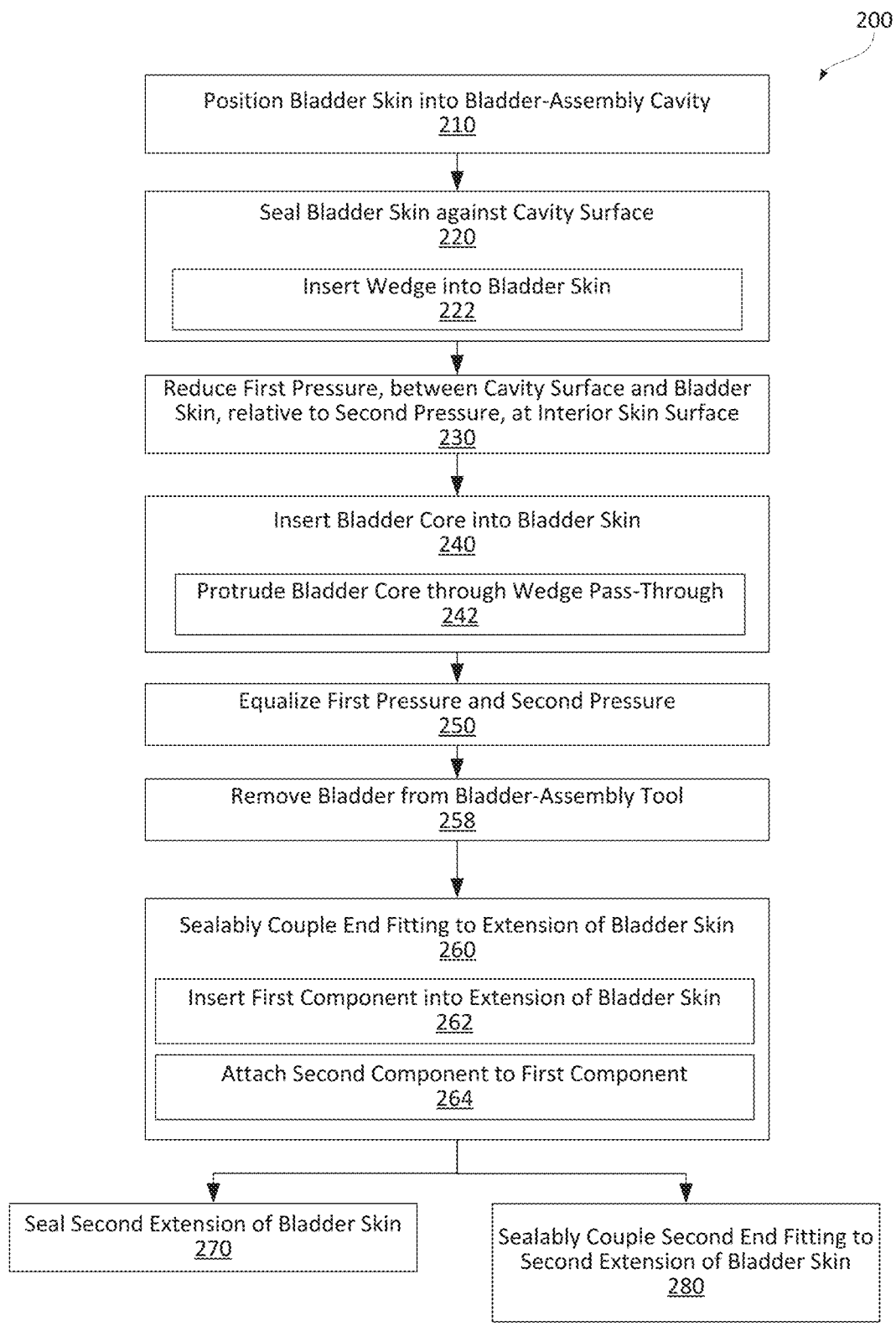
FIG. 3 is a process flowchart of assembling a bladder using a bladder-assembly tool, in accordance with some examples.

FIG. 3 is a process flowchart corresponding to method 200 of assembling bladder 110, in accordance with some examples. Various examples of bladder 110 are described above with reference to FIGS. 2A-2C. Various operations of method 200 are performed using bladder-assembly tool 300. Key features of bladder-assembly tool 300 are described below with reference to specific operations. Furthermore, various stages of method 200 are shown in FIGS. 4A-11 as indicated below.

Figure 4A:
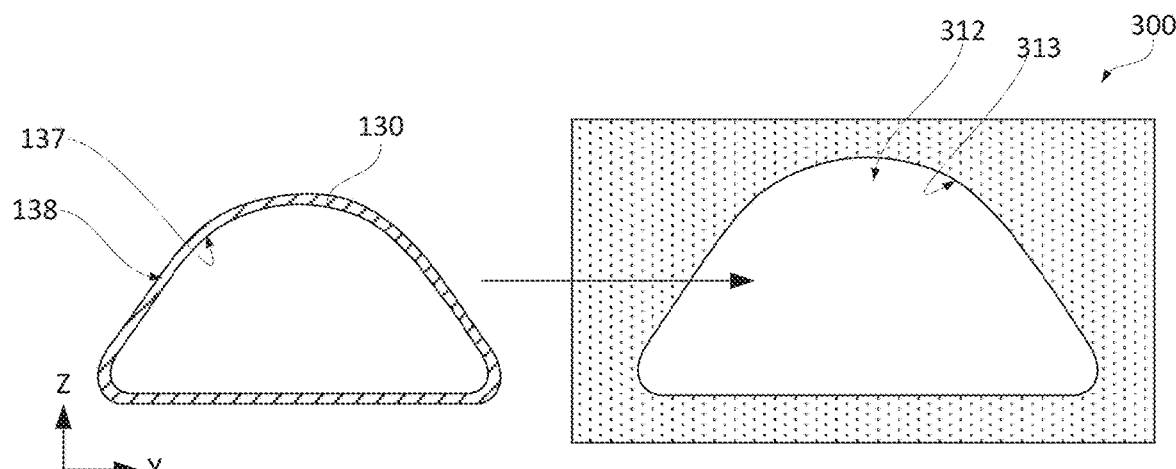
FIGS. 4A, 4B, and 4C are schematic cross-sectional views of the bladder-assembly tool while positioning a bladder skin into the bladder-assembly cavity of the tool, in accordance with some examples.
Figure 4B:
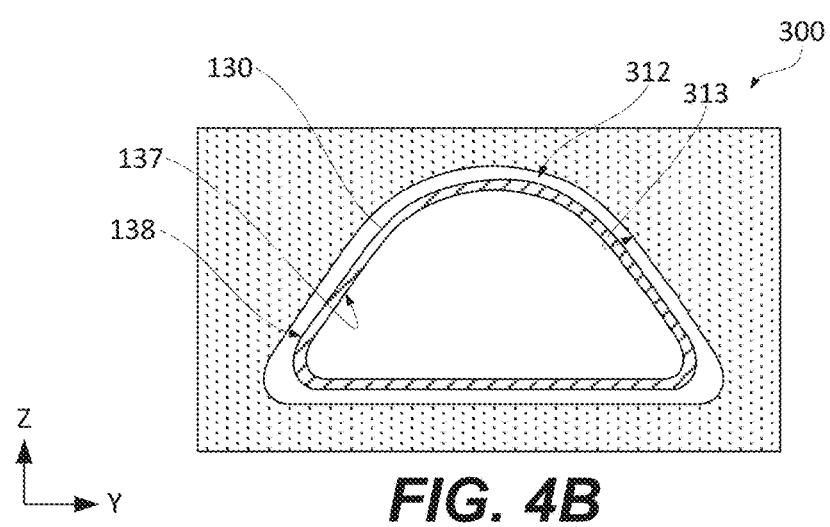
Figure 4C:
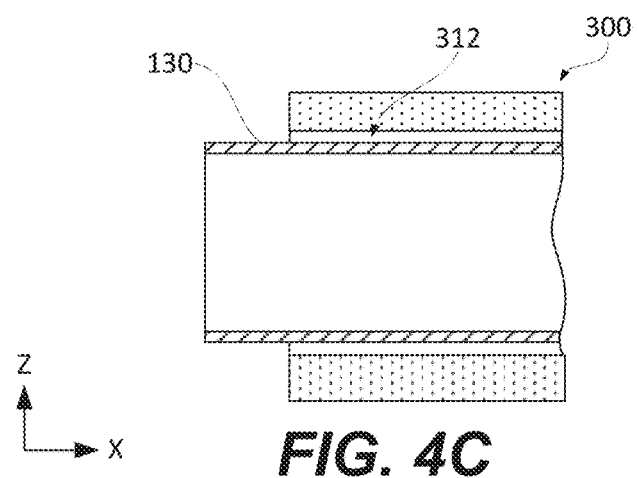

In some examples, method 200 commences with (block 210) positioning bladder skin 130 into bladder-assembly cavity 312 of bladder-assembly tool 300 as, e.g., is schematically shown in FIGS. 4A, 4B, and 4C. At this stage, bladder skin 130 does not conform to bladder-assembly cavity 312 allowing simple inserting of bladder skin 130. Specifically, bladder skin 130 comprising interior skin surface 137 and exterior skin surface 138. Bladder skin 130 is not stretched at this stage or positioned over bladder core 120. Bladder-assembly cavity 312 comprises cavity surface 313. Exterior skin surface 138 of bladder skin 130 does not conform to cavity surface 313, which enables this operation. Referring to the cross-section of bladder skin 130 and bladder-assembly tool 300, the circumference of exterior skin surface 138 is shorter than cavity surface 313.

Figure 5:
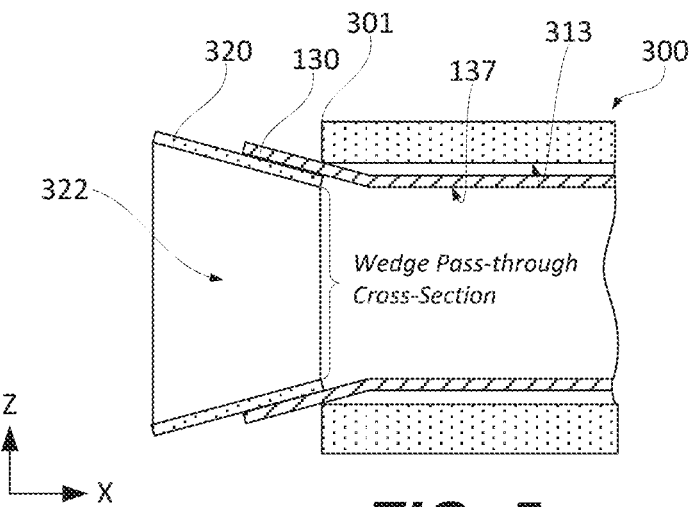
FIG. 5 is a schematic cross-sectional view of the bladder-assembly tool while sealing the bladder skin against the cavity surface of the tool, in accordance with some examples.

In some examples, method 200 proceeds with (block 220) sealing bladder skin 130 against cavity surface 313, It should be noted that bladder skin 130 is sealed at each end 301 of bladder-assembly tool 300. Various sealing options are within the scope. For example, FIG. 5 illustrates wedge 320 inserted into bladder skin 130. Specifically, in this example, the sealing operation comprises (block 222) inserting wedge 320 into bladder skin 130 thereby pushing bladder skin 130 against cavity surface 313. Wedge 320 stretches a portion of bladder skin 130. It should be noted that wedge 320 comprises wedge pass-through 322. The smallest cross-section of wedge pass-through 322 is greater than the corresponding cross-section of bladder core 120, which allows inserting bladder core 120 into bladder skin 130 through wedge pass-through 322.

Figure 6A:
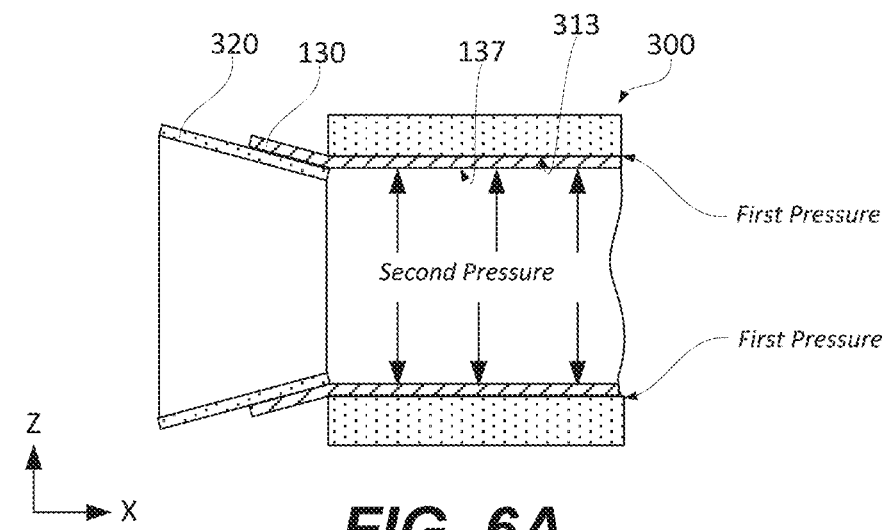
FIGS. 6A, 6B, 6C, 6D, 6E, and 6F are schematic cross-sectional views of the bladder-assembly tool while stretching the bladder skin and conforming the bladder skin against the cavity surface, in accordance with some examples.
Figure 6B:
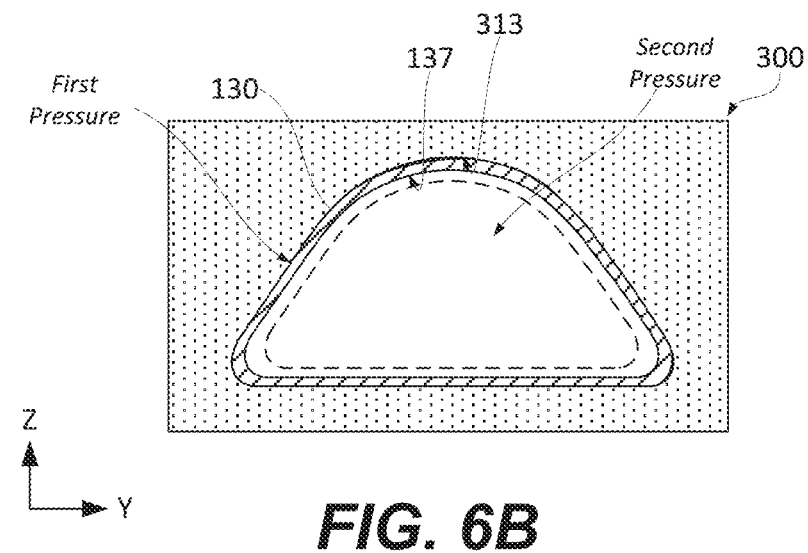

In some examples, method 200 proceeds with (block 230) reducing the first pressure, between cavity surface 313 and bladder skin 130, relative to a second pressure, at interior skin surface 137. This pressure differential (between the first pressure and the second pressure) stretches bladder skin 130 and pushes bladder skin 130 against cavity surface 313 as, e.g., is schematically shown in FIGS. 6A-6B. More specifically, bladder skin 130 conforms to cavity surface 313. This stretching of bladder skin 130 allows the insertion of bladder core 120 into bladder skin 130 without interference. At this stage, the cross-section of interior skin surface 137 is greater than the cross-section of bladder core 120 (schematically shown with a dashed line). It should be noted that bladder skin 130 remains sealed against cavity surface 313 which allows reducing the first pressure. In some examples, reducing the first pressure comprises connecting bladder-assembly tool 300 to a vacuum source. In other words, the first pressure is below the atmospheric pressure level. The second pressure is at the atmospheric pressure level, e.g., the interior of bladder skin 130 is open to the atmosphere.

Figure 6C:
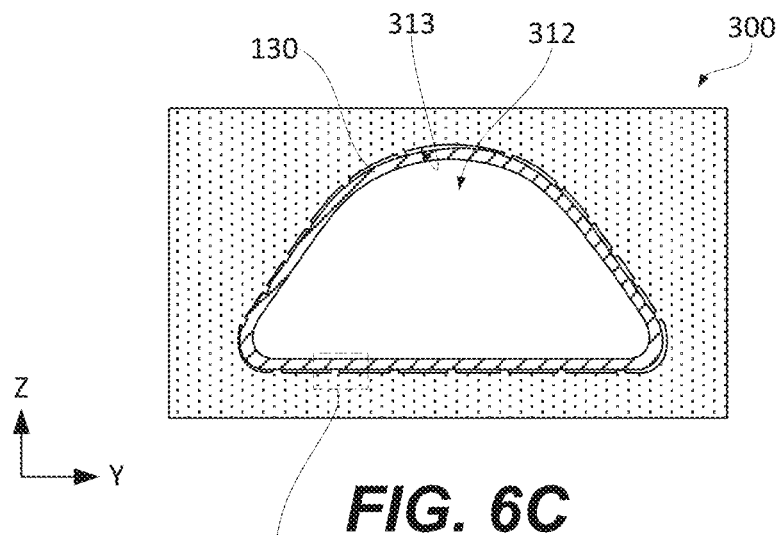
Figure 6D:
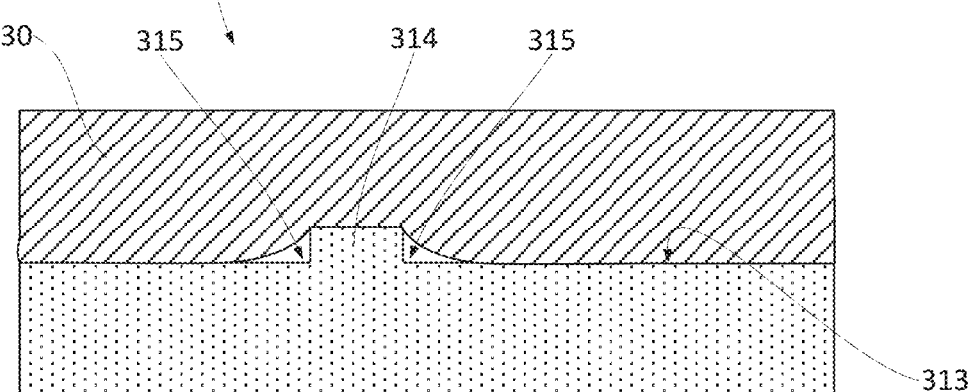
Figure 6E:
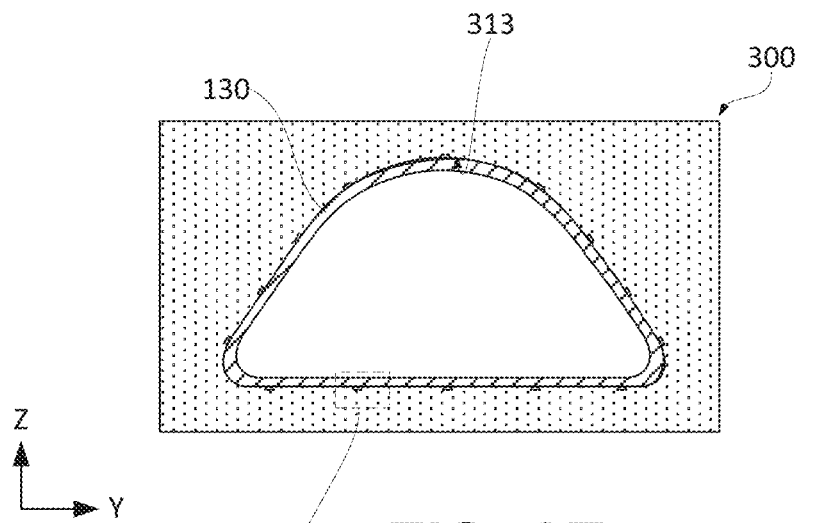
Figure 6F:
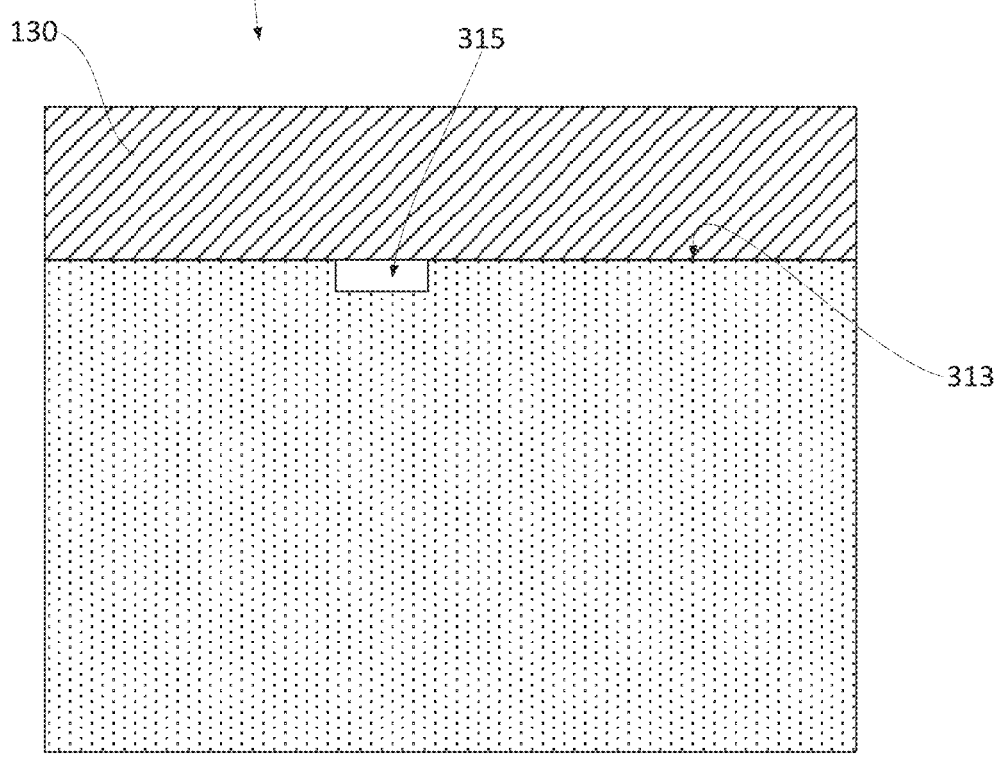

Referring to FIGS. 6C and 6D, in some examples, bladder-assembly tool 300 comprises interior protrusions 314, extending into bladder-assembly cavity 312 and away from cavity surface 313. Interior protrusions 314 help to maintain fluidic channels 315 between cavity surface 313 and bladder skin 130 while bladder skin 130 is conforming to cavity surface 313, These fluidic channels 315 are formed around interior protrusions 314 as, e.g., is schematically shown in FIG. 6D, while bladder skin 130 conforms to cavity surface 313. These fluidic channels 315 ensure that all bladder skin 130 (along the length of the bladder, the X-axis) is at the second pressure and conforms to cavity surface 313 by the pressure differential. Referring to FIGS. 6E and 6F, in some examples, bladder-assembly tool 300 comprises fluidic channels 315, e.g., formed within cavity surface 313.

Figure 7A:
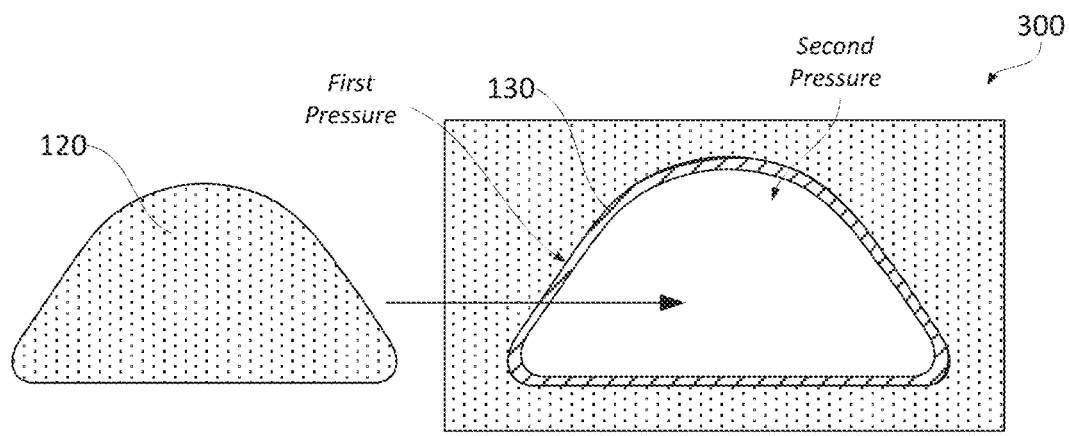
FIGS. 7A, 7B, and 7C are schematic cross-sectional views of the bladder-assembly tool while inserting the bladder core into the bladder skin while the bladder skin is conformed to the cavity surface, in accordance with some examples.
Figure 7B:
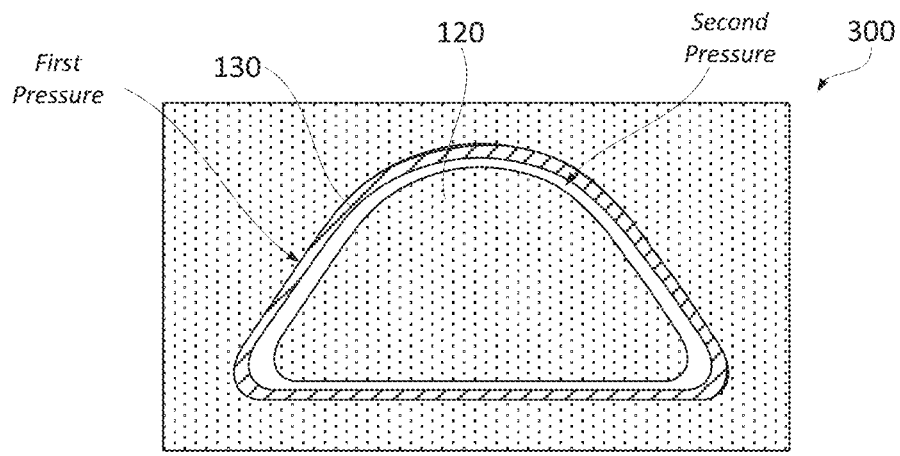
Figure 7C:
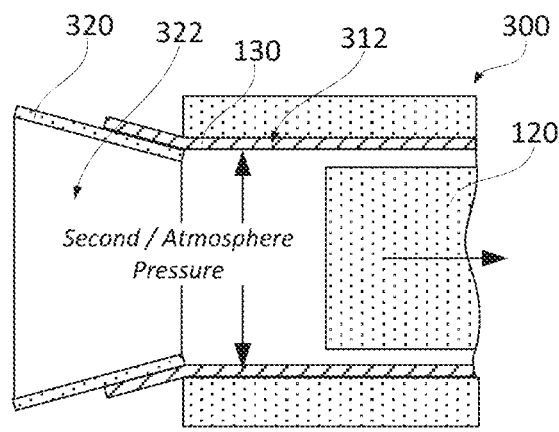

In some examples, method 200 proceeds with (block 240) inserting bladder core 120 into bladder skin 130 as, e.g., is schematically shown in FIGS. 7A-7C. This operation is performed while bladder skin 130 is conformed to cavity surface 313 (e.g., by maintaining the pressure differential across bladder skin 130 and pushing bladder skin 130 against cavity surface 313 with this pressure differential). FIG. 7B illustrates that the cross-section of interior skin surface 137 is greater than the cross-section of bladder core 120 allowing for unobstructed insertion.

In some examples, inserting bladder core 120 into bladder skin 130 comprises (block 242) protruding bladder core 120 through wedge pass-through 322 as, e.g., is schematically shown in FIG. 7C. As noted above, wedge 320 is used to seal bladder skin 130 against cavity surface 313. This seal is maintained while bladder core 120 is being inserted into bladder skin 130. Furthermore, as noted above, the smallest cross-section of wedge pass-through 322 is greater than the corresponding cross-section of bladder core 120, which allows inserting bladder core 120 into bladder skin 130 through wedge pass-through 322.

Figure 8A:
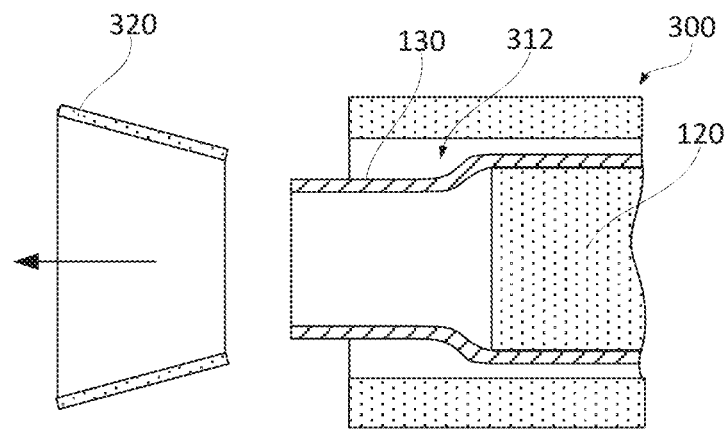
FIGS. 8A and 8B are schematic cross-sectional views of the bladder-assembly tool while the bladder skin conforms to the bladder core, in accordance with some examples.
Figure 8B:
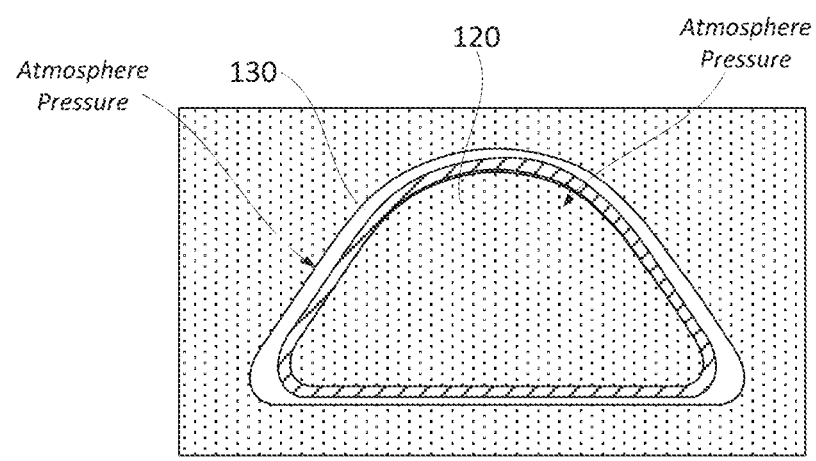

In some examples, method 200 proceeds with (block 250) equalizing the first pressure and the second pressure, e.g., by bringing both to the atmospheric pressure level. This pressure equalization allows bladder skin 130 to shrink and also allows a portion of bladder skin 130 to conform to bladder core 120 as, e.g., is schematically shown in FIGS. 8A-8B. More specifically, this pressure equalization eliminates the pressure differential, which has previously stretched bladder skin 130, Bladder skin 130 compresses toward the original form. However, in some examples, when bladder skin 130 conforms to bladder core 120, bladder skin 130 remains partially stretched, at least the portion of bladder skin 130 contacting bladder core 120. In some examples, the stretching level is at least about 1% over bladder core 120, at least about 2%, at least about 5%, and at least about 10%. After this operation, the cross-sectional shape of cavity surface 313 corresponds to the cross-sectional shape of bladder core 120. Furthermore, at this point, a combination of bladder skin 130 and bladder core 120 is removable from bladder-assembly tool 300.

Figure 9A:
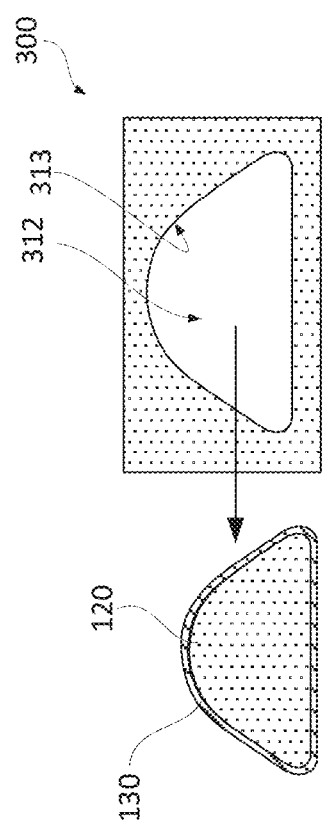
FIGS. 9A and 9B are schematic cross-sectional views of removing the bladder from the bladder-assembly tool, in accordance with some examples.
Figure 9B:
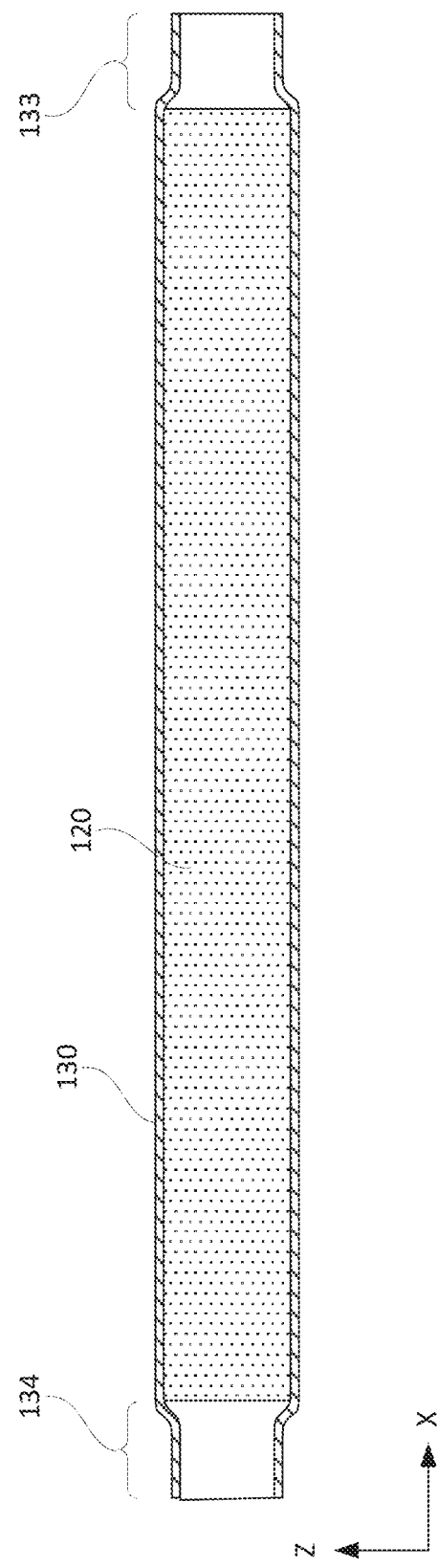

In some examples, method 200 further comprises (block 258) removing bladder 110 from bladder-assembly tool 300 as, for example, is schematically shown in FIGS. 9A and 9B. This operation is performed after the portion of bladder skin 130 conforms to bladder core 120, and bladder skin 130 and does not conform to cavity surface 313. As such, there is no interference between bladder skin 130 and cavity surface 313, allowing the removal of bladder 110 from bladder-assembly cavity 312. FIG. 9B illustrates bladder 110 after completing this removal operation. For example, bladder skin 130 comprises extension 133 and second extension 134, extending past bladder core 120.

Figure 10A:
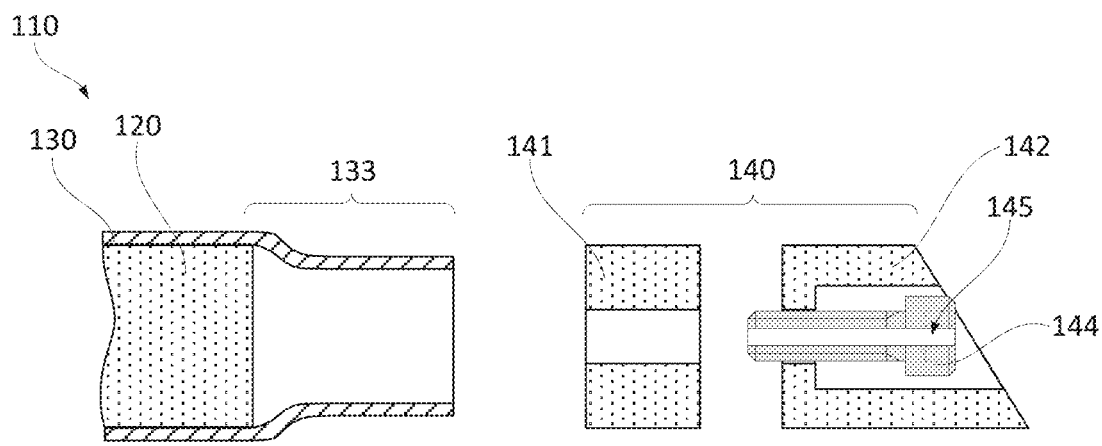
FIGS. 10A, 10B, and 10C are schematic cross-sectional views of sealably coupling an end fitting to the extension of the bladder skin, in accordance with some examples.
Figure 10B:
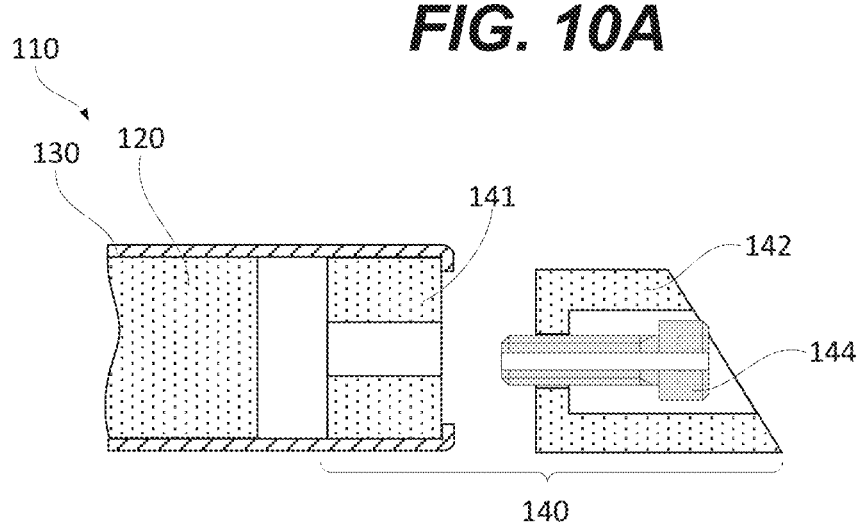
Figure 10C:
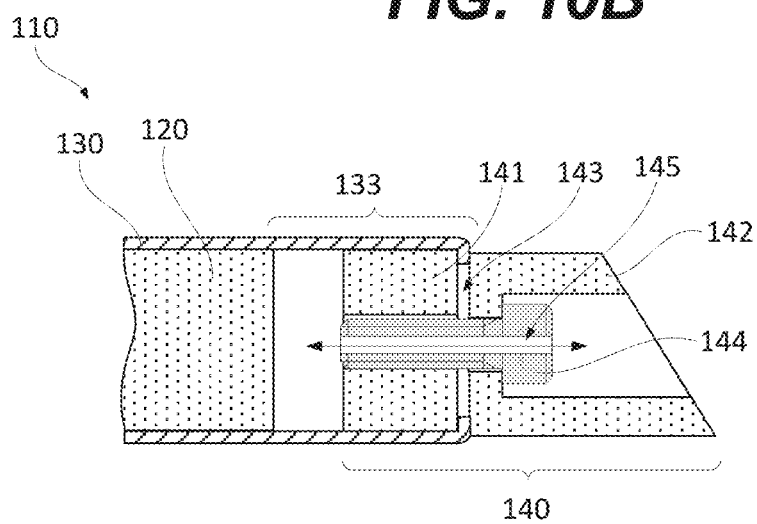

In some examples, method 200 further comprises (block 260) sealably coupling end fitting 140 to extension 133 of bladder skin 130 as, e.g., is schematically shown in FIGS. 10A-10C. Specifically, extension 133 extends past bladder core 120 such that bladder core 120 does not interfere with end fitting 140. For example, extension 133 wraps over and conforms to end fitting 140.

In some examples, end fitting 140 comprises first component 141 and second component 142. In these examples, sealably coupling end fitting 140 to extension 133 comprises (block 262) inserting first component 141 into extension 133 of bladder skin 130 and (block 264) attaching second component 142 to first component 141. In some examples, the operations, which are represented by block 262 and block 264, in FIG. 3 are performed such that a part of extension 133 of bladder skin 130 extends into channel 143 between first component 141 and second component 142. More specifically, this part of extension 133 is compressed in channel 143 by first component 141 and second component 142 as, e.g., is schematically shown in FIG. 10C. In some examples and referring to block 264 in FIG. 3, attaching second component 142 to first component 141 is performed using screw 144. More specifically, pass-through 145 extends through screw 144.

In some examples, method 200 further comprises (block 270) sealing a second extension 134 of bladder skin 130 as, e.g., is schematically shown in FIG. 11A. Second extension 134 extends past bladder core 120 and away from extension 133 such that bladder core 120 is positioned between extension 133 and second extension 134.

In some examples, method 200 further comprises (block 280) sealably coupling second end fitting 150 to a second extension 134 of bladder skin 130 as, e.g., is schematically shown in FIG. 11B. Second end fitting 150 comprises second-fitting pass-through 155, fluidically coupled to bladder core 120. Furthermore, end fitting 140 comprises pass-through 145, fluidically coupled to bladder core 120.

Examples of Methods of Forming Composite Stringers

Figure 12:
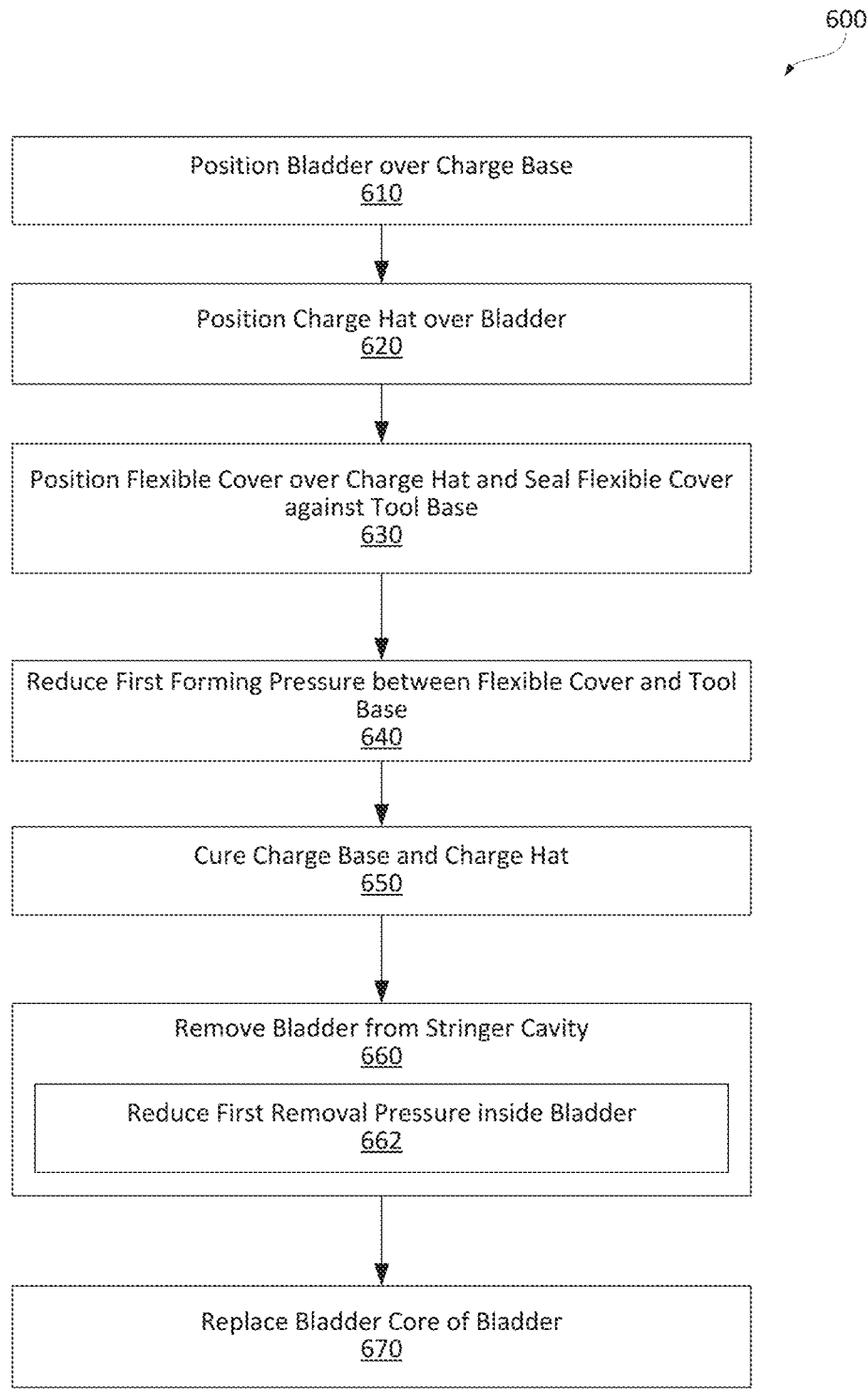
FIG. 12 is a process flowchart of forming a composite stringer assembly from a composite charge using a stringer forming tool, in accordance with some examples.

FIG. 12 is a process flowchart corresponding to method 600 of forming composite stringer assembly 190, in accordance with some embodiments. Composite stringer assembly 190 is formed from composite charge 180 using stringer forming tool 100. Various examples of composite charge 180 and composite stringer assembly 190 are described above with reference to FIGS. 1A and 1B. In some examples, stringer forming tool 100 comprises bladder 110, various examples of which are described above with reference to FIGS. 2A-FIG. 11B.

Figure 13A:
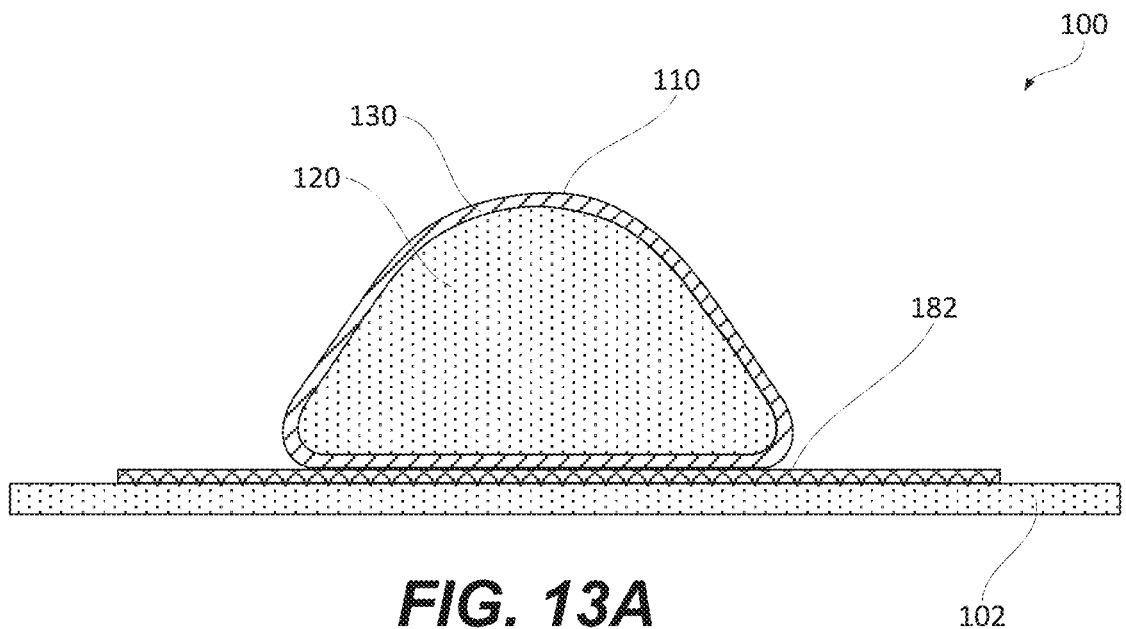
FIGS. 13A, 13B, 13C, and 13D are schematic views of different stages while forming the composite stringer, in accordance with some examples.

In some examples, method 600 comprises (block 610) positioning bladder 110 over charge base 182 as, e.g., is schematically shown in FIG. 13A. Charge base 182 is a part of composite charge 180 and is positioned over tool base 102 of stringer forming tool 100. In some examples, charge base 182 is substantially planar. Bladder 110 is shaped in accordance with the design of composite stringer assembly 190. As described above, bladder 110 comprises bladder core 120 and bladder skin 130. Bladder core 120 defines the shape, while bladder skin 130 encloses bladder core 120 and contacts charge base 182.

Figure 13B:
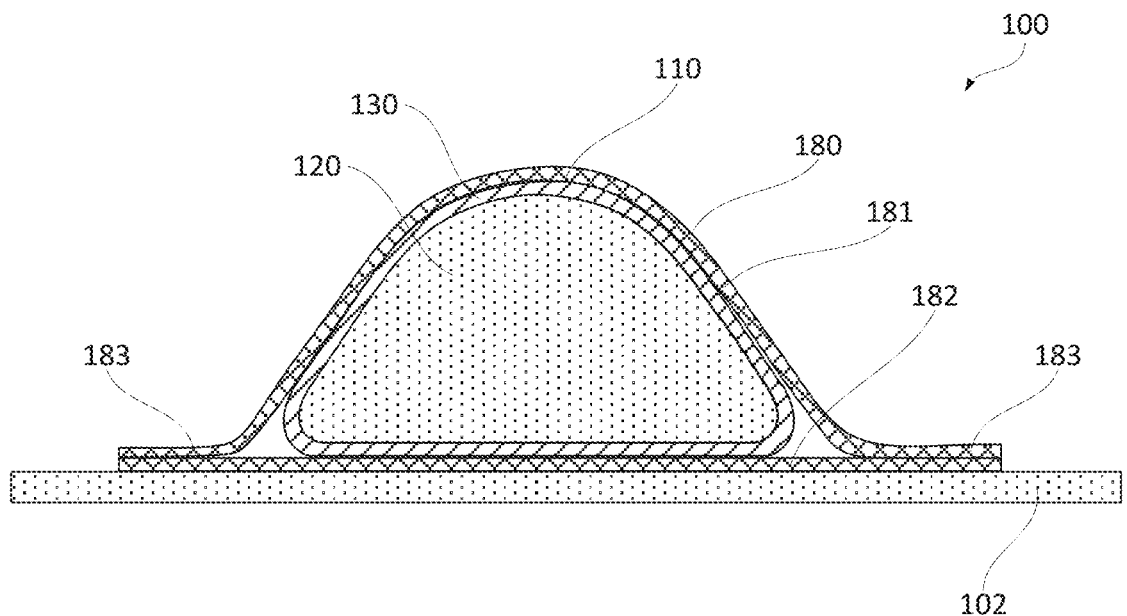

In some examples, method 600 proceeds with (block 620) positioning charge hat 181 over bladder 110 as, e.g., is schematically shown in FIG. 13B. For example, charge hat 181 at least partially conforms to bladder 110 during this operation. In some examples, charge hat 181 is initially provided as a planar component and then formed around bladder 110 while bladder 110 maintains the shape during this forming operation.

Figure 13C:
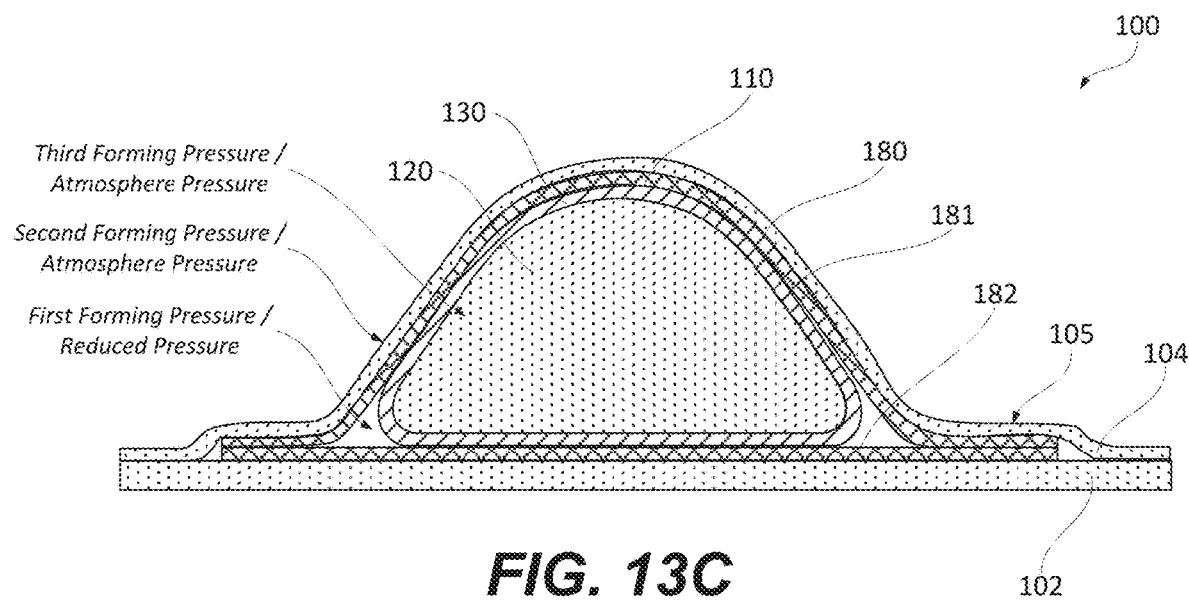

In some examples, method 600 proceeds with (block 630) positioning flexible cover 104 of stringer forming tool 100 over charge hat 181 and sealing flexible cover 104 against tool base 102 as, e.g., is schematically shown in FIG. 13C. This sealing allows reducing the pressure between flexible cover 104 and tool base 102, e.g., to apply the external pressure (by the atmosphere) and to conform charge hat 181 to bladder 110. In some examples, charge hat 181 comprises hat ends 183, directly contacting charge base 182.

In some examples, method 600 proceeds with (block 640) reducing a first forming pressure between flexible cover 104 and tool base 102 as, e.g., is schematically shown in FIG. 13C, The first forming pressure is reduced below a second forming pressure at an outer cover surface 105. This pressure differential forces flexible cover 104 and charge hat 181 toward bladder 110 thereby conforming charge hat 181 to bladder 110.

Furthermore, in some examples, the first forming pressure is also reduced below a third forming pressure inside bladder 110 as, e.g., is schematically shown in FIG. 13C. This third pressure helps bladder 110 to maintain the shape while charge hat 181 is forced against bladder 110. In some examples, each of the second forming pressure and the third forming pressure is an atmospheric pressure level, e.g., corresponding structures are exposed to the atmosphere.

In some examples, method 600 proceeds with (block 650) curing charge base 182 and charge hat 181. For example, the entire assembly, which is shown in FIG. 13C, is placed into an autoclave, oven, or other similar tools. This curing operation is performed while charge hat 181 is forced against bladder 110. Furthermore, bladder 110 maintains its shape during this curing operation. The curing operation forms stringer base 192 and stringer hat 191 of composite stringer assembly 190. Stringer base 192 and stringer hat 191 are rigid structures and further support by bladder 110 is not needed. Therefore, bladder 110 can be removed from stringer cavity 193 after curing.

Figure 13D:
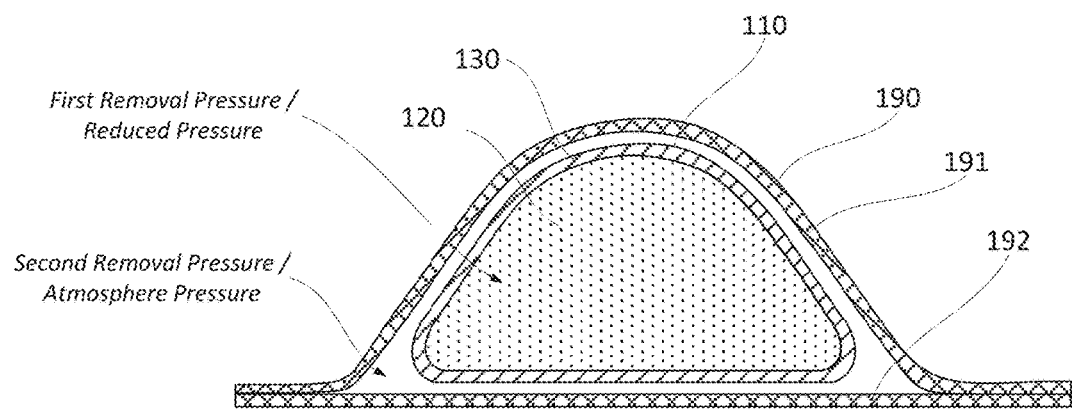

In some examples, method 600 proceeds with (block 660) removing bladder 110 from stringer cavity 193. More specifically, removing bladder 110 from stringer cavity 193 comprises (block 662) reducing a first removal pressure inside bladder 110. The first removal pressure is reduced below a second removal pressure inside stringer cavity 193. This pressure differential compresses bladder 110 and separates bladder 110 from stringer base 192 and stringer hat 191 as, e.g., is schematically shown in FIG. 13D. In some examples, the second removal pressure is atmospheric pressure.

In some examples, method 600 proceeds with (block 670) replacing bladder core 120 of bladder 110. For example, bladder core 120 collapses when bladder 110 is removed from stringer cavity 193 and no longer has the desired shape. The process of bladder core 120 is similar to the process of assembling bladder 110 described above with reference to FIG. 3-11B.

Aircraft Examples

In some examples, methods and systems described above are used on aircraft and, more generally, by the aerospace industry. Specifically, these methods and systems can be used during the fabrication of aircraft as well as during aircraft service and maintenance.

Figure 14:
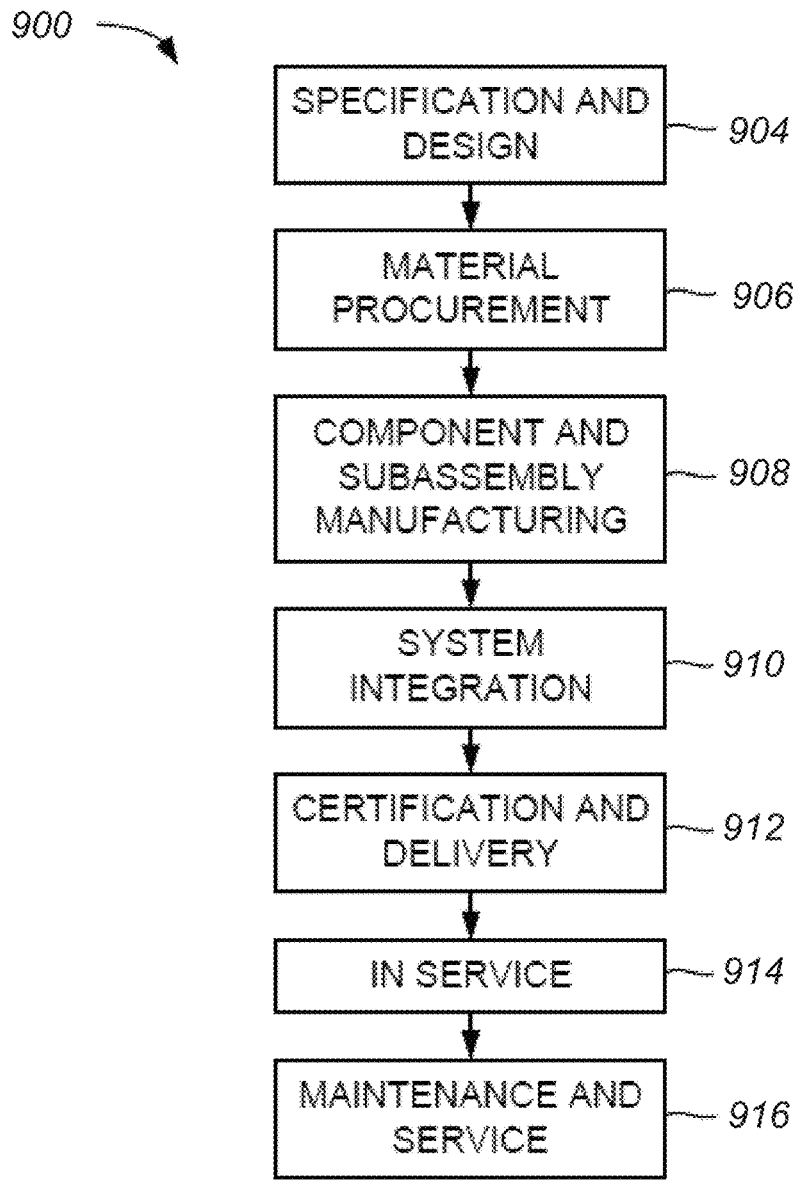
FIG. 14 is a process flowchart corresponding to a method for manufacturing and servicing the aircraft, in accordance with some examples.
Figure 15:
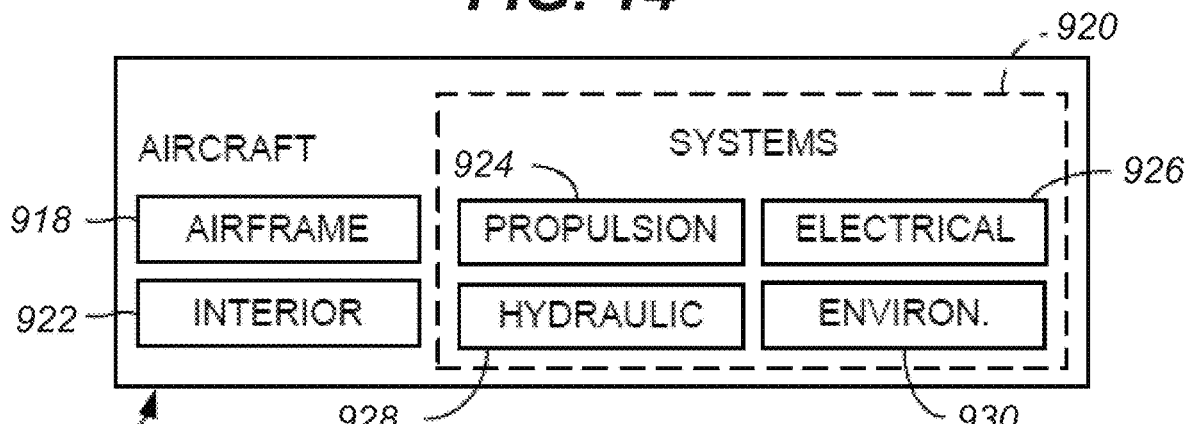
FIG. 15 illustrates a block diagram of an example aircraft, in accordance with some examples, in accordance with some examples.

Accordingly, the apparatus and methods described above are applicable for aircraft manufacturing and service method 900 as shown in FIG. 14 and for aircraft 902 as shown in FIG. 15. During pre-production, method 900 includes specification and design 904 of aircraft 902 and material procurement 906. During production, component, and subassembly manufacturing 908 and system integration 910 of aircraft 902 takes place. Thereafter, aircraft 902 goes through certification and delivery 912 to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For purposes of this description, a system integrator includes without limitation any number of aircraft manufacturers and major-system subcontractors; a third party includes without limitation any number of vendors, subcontractors, and suppliers; and an operator can be an airline, leasing company, military entity, service organization, and so on.

As shown in FIG. 15, aircraft 902 produced by method 900 includes airframe 918 with plurality of systems 920 and interior 922. The airframe 918 includes the wings of the aircraft 902. Examples of systems 920 include one or more of propulsion system 924, electrical system 926, hydraulic system 928, and environmental system 930. Any number of other systems can be included.

Apparatus and methods presented herein can be employed during any one or more of the stages of method 900. For example, components or subassemblies corresponding to manufacturing 908 are fabricated or manufactured like components or subassemblies produced while aircraft 902 is in service. Also, one or more apparatus examples, method examples, or a combination thereof are utilized during manufacturing 908 and system integration 910, for example, by substantially expediting assembly of or reducing the cost of an aircraft 902. Similarly, one or more apparatus examples, method examples, or a combination thereof are utilized while aircraft 902 is in service, for example, and without limitation, to maintenance and service 916.

Further Examples

Further, the description includes examples according to the following clauses:

Clause 1. A bladder for shaping a composite charge while forming a composite stringer assembly, the bladder comprising:
a bladder core, formed from a foam and comprising a base surface and a hat-shaping surface; and
a bladder skin, formed from an elastic material, wherein the bladder skin encloses the bladder core, and wherein at least a portion of the bladder skin contacts, conforms, and compresses each of the base surface and the hat-shaping surface.

Clause 2. The bladder of clause 1, wherein the bladder skin comprises an extension, extending past the bladder core.

Clause 3. The bladder of clause 2, further comprising an end fitting, sealably coupled to the extension of the bladder skin, the end fitting comprises a pass-through, fluidically coupled to the bladder core.

Clause 4. The bladder of clause 3, wherein the pass-through is selectively couplable to an atmosphere or a vacuum source.

Clause 5. The bladder of clause 3, wherein:
the end fitting comprises a first component and a second component, detachably coupled to the first component and forming a channel with the first component, and
wherein the extension of the bladder skin encloses, conforms, and compresses the first component and partially extends into the channel where the extension is compressed between the first component and the second component.

Clause 6. The bladder of clause 5, wherein the first component and the second component are detachably coupled using a screw such that the pass-through extends through the screw.

Clause 7. The bladder of any one of clauses 2-6, wherein the bladder skin comprises a second extension, extending past the bladder core and away from the extension such that the bladder core is positioned between the extension and the second extension.

Clause 8. The bladder of clause 7, wherein the second extension is sealed and gas-impermeable.

Clause 9. The bladder of clause 7, further comprising a second end fitting, sealably coupled to the second extension of the bladder skin, the second end fitting comprises a second-fitting pass-through, fluidically coupled to the bladder core.

Clause 10. The bladder of clause 1, wherein the foam of the bladder core comprises polyethylene terephthalate foam.

Clause 11. The bladder of any one of clauses 1-10, wherein the elastic material of the bladder skin comprises one or more materials selected from the group consisting of silicone, Viton, and butyl rubber.

Clause 12. The bladder of any one of clauses 1-11, wherein the bladder skin is stretched at least about 5% over the bladder core.

Clause 13. A method of assembling a bladder using a bladder-assembly tool, comprising a bladder-assembly cavity, the method comprising:
positioning a bladder skin, comprising an interior skin surface, into the bladder-assembly cavity, comprising a cavity surface;
sealing the bladder skin against the cavity surface at each end of the bladder-assembly tool;
reducing a first pressure, between the cavity surface and the bladder skin, relative to a second pressure, at the interior skin surface, thereby stretching the bladder skin and conforming the bladder skin against the cavity surface;
inserting a bladder core into the bladder skin while the bladder skin is conformed to the cavity surface; and
equalizing the first pressure and the second pressure thereby allowing bladder skin to shrink and allowing at least a portion of the bladder skin to conform to the bladder core.

Clause 14. The method of clause 13, wherein the second pressure is maintained at an atmospheric pressure level.

Clause 15. The method of any one of clauses 13-14, wherein a cross-sectional shape of the cavity surface corresponds to a cross-sectional shape of the bladder core.

Clause 16. The method of any one of clauses 13-15, wherein:
sealing the bladder skin against the cavity surface comprises inserting a wedge into the bladder skin thereby pushing the bladder skin against the cavity surface,
the wedge comprises a wedge pass-through, and
inserting the bladder core into the bladder skin comprises protruding the bladder core through the wedge pass-through.

Clause 17. The method of any one of clauses 13-16, further comprising sealably coupling an end fitting to an extension of the bladder skin,
wherein the end fitting comprises a pass-through, fluidically coupled to the bladder core, and
wherein the extension extends past the bladder core.

Clause 18. The method of clause 17, wherein the end fitting comprises a first component and a second component, and
wherein sealably coupling the end fitting to the extension comprises:
inserting the first component into the extension of the bladder skin, and
attaching the second component to the first component such that a part of the extension of the bladder skin extends into a channel between the first component and the second component and is compressed in the channel by the first component and the second component.

Clause 19. The method of clause 18, wherein attaching the second component to the first component is performed using a screw such that the pass-through extends through the screw.

Clause 20. The method of clause 17, further comprising sealing a second extension of the bladder skin, wherein the second extension extends past the bladder core and away from the extension such that the bladder core is positioned between the extension and the second extension.

Clause 21. The method of clause 17, further comprising sealably coupling a second end fitting to a second extension of the bladder skin, wherein the second end fitting comprises a second-fitting pass-through, fluidically coupled to the bladder core, and wherein the end fitting comprises a pass-through, fluidically coupled to the bladder core.

Clause 22. The method of any one of clauses 13-21, wherein the bladder-assembly tool comprises interior protrusions, extending into the bladder-assembly cavity and away from the cavity surface.

Clause 23. The method of any one of clauses 13-22, further comprising, after the portion of the bladder skin conforms to the bladder core, removing the bladder from the bladder-assembly tool.

Clause 24. The method of any one of clauses 13-23, wherein the bladder skin stretches at least 5% while reducing the first pressure.

Clause 25. A method of forming a composite stringer assembly from a composite charge using a stringer forming tool, comprising a bladder, the method comprising:

positioning the bladder over a charge base, positioned over a tool base of the stringer forming tool;

positioning a charge hat over the bladder, comprising a bladder core and a bladder skin;

positioning a flexible cover of the stringer forming tool over the charge hat and sealing the flexible cover against the tool base;

reducing a first forming pressure, between the flexible cover and the tool base below a second forming pressure at an outer cover surface and also below a third forming pressure inside the bladder thereby forcing the charge hat against the bladder with the flexible cover;

curing the charge base and charge hat while the charge hat is forced against the bladder thereby forming a stringer base and a stringer hat of the composite stringer assembly, the stringer base and the stringer hat form a stringer cavity; and removing the bladder from the stringer cavity.

Clause 26. The method of clause 25, wherein removing the bladder from the stringer cavity comprises reducing a first removal pressure, inside the bladder, below a second removal pressure inside the stringer cavity thereby compressing the bladder and separating the bladder from the stringer base and the stringer hat.

Clause 27. The method of clause 26, wherein the second removal pressure is atmospheric pressure.

Cause 28. The method of clause 26, further comprising replacing the bladder core of the bladder.

Clause 29. The method of any one of clauses 25-28, wherein each the second forming pressure and the third forming pressure is atmospheric pressure.

Clause 30. The method of any one of clauses 25-29, wherein the charge hat comprises hat ends, directly contacting the charge base.

CONCLUSION

Although the foregoing concepts have been described in some detail for purposes of clarity of understanding, it will be apparent that certain changes and modifications may be practiced within the scope of the appended clauses. It should be noted that there are many alternative ways of implementing the processes, systems, and apparatus. Accordingly, the present examples are to be considered illustrative and not restrictive.

What is claimed is:

1. A method of assembling a bladder using a bladder-assembly tool, comprising a bladder-assembly cavity, the method comprising:

positioning a bladder skin, comprising an interior skin surface, into the bladder-assembly cavity, comprising a cavity surface;

sealing the bladder skin against the cavity surface at each end of the bladder-assembly tool;

reducing a first pressure, between the cavity surface and the bladder skin, relative to a second pressure, at the interior skin surface, thereby stretching the bladder skin and conforming the bladder skin against the cavity surface;

inserting a bladder core into the bladder skin while the bladder skin is conformed to the cavity surface; and equalizing the first pressure and the second pressure thereby allowing bladder skin to shrink and allowing at least a portion of the bladder skin to conform to the bladder core.

2. The method of claim 1, wherein the second pressure is maintained at an atmospheric pressure level.

3. The method of claim 1, wherein a cross-sectional shape of the cavity surface corresponds to a cross-sectional shape of the bladder core.

4. The method of claim 1, wherein:

sealing the bladder skin against the cavity surface comprises inserting a wedge into the bladder skin thereby pushing the bladder skin against the cavity surface, the wedge comprises a wedge pass-through, and inserting the bladder core into the bladder skin comprises protruding the bladder core through the wedge pass-through.

5. The method of claim 1, further comprising sealably coupling an end fitting to an extension of the bladder skin, wherein the end fitting comprises a pass-through, fluidically coupled to the bladder core, and wherein the extension extends past the bladder core.

6. The method of claim 5, wherein the end fitting comprises a first component and a second component, and wherein sealably coupling the end fitting to the extension comprises:

inserting the first component into the extension of the bladder skin, and attaching the second component to the first component such that a part of the extension of the bladder skin extends into a channel between the first component and the second component and is compressed in the channel by the first component and the second component.

7. The method of claim 6, wherein attaching the second component to the first component is performed using a screw such that the pass-through extends through the screw.

8. The method of claim 1, wherein the bladder comprises:

the bladder core, formed from a foam and comprising a base surface and a hat-shaping surface; and the bladder skin, formed from an elastic material, wherein the bladder skin encloses the bladder core, and wherein at least a portion of the bladder skin contacts, conforms, and compresses each of the base surface and the hat-shaping surface.

9. The method of claim 8, wherein the bladder skin comprises an extension, extending past the bladder core.

10. The method of claim 9, the bladder further comprising an end fitting, sealably coupled to the extension of the bladder skin, the end fitting comprises a pass-through, fluidically coupled to the bladder core.

11. The method of claim 10, wherein the pass-through is selectively couplable to an atmosphere or a vacuum source.

12. The method of claim 10, wherein:
the end fitting comprises a first component and a second component, detachably coupled to the first component and forming a channel with the first component, and
the extension of the bladder skin encloses, conforms, and compresses the first component and partially extends into the channel where the extension is compressed between the first component and the second component.

13. The method of claim 12, wherein the first component and the second component are detachably coupled using a screw such that the pass-through extends through the screw.

14. The method of claim 9, wherein the bladder skin comprises a second extension, extending past the bladder core and away from the extension such that the bladder core is positioned between the extension and the second extension.

15. The method of claim 14, wherein the second extension is sealed and gas-impermeable.

16. The method of claim 14, the bladder further comprising a second end fitting, sealably coupled to the second extension of the bladder skin, the second end fitting comprises a second-fitting pass-through, fluidically coupled to the bladder core.

17. The method of claim 8, wherein the foam of the bladder core comprises polyethylene terephthalate foam.

18. The method of claim 8, wherein the elastic material of the bladder skin comprises one or more materials selected from the group consisting of silicone, Viton, and butyl rubber.

19. The method of claim 8, wherein the bladder skin is stretched at least about 5% over the bladder core.

20. The method of claim 1, further comprising:
positioning the bladder over a charge base, positioned over a tool base of a stringer forming tool;
positioning a charge hat over the bladder, comprising the bladder core and the bladder skin;
positioning a flexible cover of the stringer forming tool over the charge hat and sealing the flexible cover against the tool base;
reducing a first forming pressure, between the flexible cover and the tool base below a second forming pressure at an outer cover surface and also below a third forming pressure inside the bladder thereby forcing the charge hat against the bladder with the flexible cover;
curing the charge base and charge hat while the charge hat is forced against the bladder thereby forming a stringer base and a stringer hat of the composite stringer assembly, the stringer base and the stringer hat form a stringer cavity; and
removing the bladder from the stringer cavity.

* * * * *